United States Patent
Scheideler et al.

(10) Patent No.: US 10,740,398 B2
(45) Date of Patent: Aug. 11, 2020

(54) STRUCTURING INCOHERENT NODES BY SUPERIMPOSING ON A BASE KNOWLEDGE GRAPH

(71) Applicant: International Business Machines Corporation, Armonk, NY (US)

(72) Inventors: Tim U. Scheideler, Schoenenberg (CH); Stefan Ravizza, Wallisellen (CH); Andrea Giovannini, Zurich (CH); Avdyl Haxhaj, Adlikon bei Regensdorf (CH); Simon Streit, Zürich (CH); Florian Graf, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/822,653

(22) Filed: Nov. 27, 2017

(65) Prior Publication Data

US 2019/0163835 A1    May 30, 2019

(51) Int. Cl.
*G06F 17/00* (2019.01)
*G06F 16/901* (2019.01)
(Continued)

(52) U.S. Cl.
CPC .......... *G06F 16/9024* (2019.01); *G06F 16/30* (2019.01); *G06F 16/907* (2019.01); *G06N 5/022* (2013.01); *G06N 20/00* (2019.01)

(58) Field of Classification Search
CPC .. G06F 11/0709; G06F 11/079; G06F 16/954; G06F 9/5077; G06F 16/24578; G06F 16/9024
See application file for complete search history.

(56) References Cited

U.S. PATENT DOCUMENTS

| 6,778,995 B1 | 8/2004 | Gallivan |
| 9,020,947 B2 | 4/2015 | Yan et al. |

(Continued)

FOREIGN PATENT DOCUMENTS

CN    105706083    6/2016

OTHER PUBLICATIONS

Clark et al., Automatically Structuring Domain Knowledge From Text: An Overview of Current Research, Information Processing & Management, vol. 48, Issue 3, May 2012, pp. 552-568, Retrieved from Internet: URL: http://www.sciencedirect.com/science/article/pii/S0306457311000720, 4 pages.

(Continued)

*Primary Examiner* — Truong V Vo
(74) *Attorney, Agent, or Firm* — Schmeiser, Olsen & Watts, LLP; Mark Vallone

(57) ABSTRACT

A computer program product, system, and method for building a knowledge graph may include receiving a plurality of new nodes, receiving a base knowledge graph having existing nodes selectively connected by existing edges, and superimposing the new nodes onto selected ones of the existing nodes of the base knowledge graph. The method may further include connecting the new nodes by creating a new edge with a new weight between at least two of the new nodes if corresponding existing nodes in the underlying base knowledge graph have a connection via zero or a predetermined maximum number of existing edges, wherein the new weight is determined based on the existing weights of the existing edges of connections between the corresponding existing nodes, and detaching the new nodes with the new edges from the base knowledge graph.

25 Claims, 8 Drawing Sheets

(51) Int. Cl.
    *G06N 5/02*     (2006.01)
    *G06F 16/907*   (2019.01)
    *G06N 20/00*    (2019.01)
    *G06F 16/30*    (2019.01)

(56) References Cited

U.S. PATENT DOCUMENTS

| | | |
|---|---|---|
| 2015/0347572 A1 | 12/2015 | Yang et al. |
| 2016/0328379 A1 | 11/2016 | Tsunokawa |
| 2017/0076206 A1 | 3/2017 | Lastras-Montano et al. |
| 2017/0132189 A1 | 5/2017 | Horikiri et al. |
| 2017/0161242 A1 | 6/2017 | Clark et al. |
| 2018/0373699 A1* | 12/2018 | McAteer ............ G06F 17/2785 |

OTHER PUBLICATIONS

Mineau, et al., Automatic Structuring of Knowledge Bases by Conceptual Clustering, IEEE Transactions on Knowledge and Data Engineering ( vol. 7, Issue: 5, Oct. 1995), Retrieved from Internet: URL: http://ieeexplore.ieee.org/abstract/document/469834/, 2 pages.

Jong, et al., Knowledge Vault: A Web-Scale Approach to Probabilistic Knowledge Fusion, KDD 14 Proceedings of the 20th ACM SIGKDD international conference on Knowledge discovery and data mining, pp. 601-610, Retrieved from Internet: URL: http://dl.acm.org/citation.cfm?id=2623623, 2 pages.

Search Report and ISR_WO; P201702131PCT1, PCT/IB2018/059257, dated Apr. 24, 2019, 9 pages.

\* cited by examiner

STRUCTURING INCOHERENT NODES BY SUPERIMPOSING ON A BASE KNOWLEDGE GRAPH

TECHNICAL FIELD

The present invention relates generally to a system, computer program product, and method for building a knowledge graph, and more specifically, to automatically building a knowledge graph from unstructured information entities.

BACKGROUND

The management of information represents a key activity in knowledge society/knowledge industry. The information may be structured or so-called unstructured information and may be managed in electronic storage systems, accessible by respective transactional or collaborative systems or, the information may newly be generated in a non-electronic form, e.g. handwritten or spoken.

SUMMARY

A method, system, and computer program product for building a knowledge graph is provided. A processor of a computing system receives a plurality of new nodes and a base knowledge graph comprising existing nodes selectively connected by existing edges, each edge of the existing edges having an existing weight. The plurality of new nodes are superimposed onto selected nodes of the existing nodes of the base knowledge graph, building pairs of new nodes and corresponding existing nodes. The plurality of new nodes are connected by creating a new edge with a new weight between at least two nodes of the plurality of new nodes if corresponding existing nodes in the underlying base knowledge graph have a connection via zero or a predetermined maximum number of existing edges, wherein the new weight is determined based on the existing weights of the existing edges of connections between the corresponding existing nodes. The plurality of new nodes are detached with the new edges from the base knowledge graph as a resulting knowledge graph.

DETAILED DESCRIPTION

Figure 1:
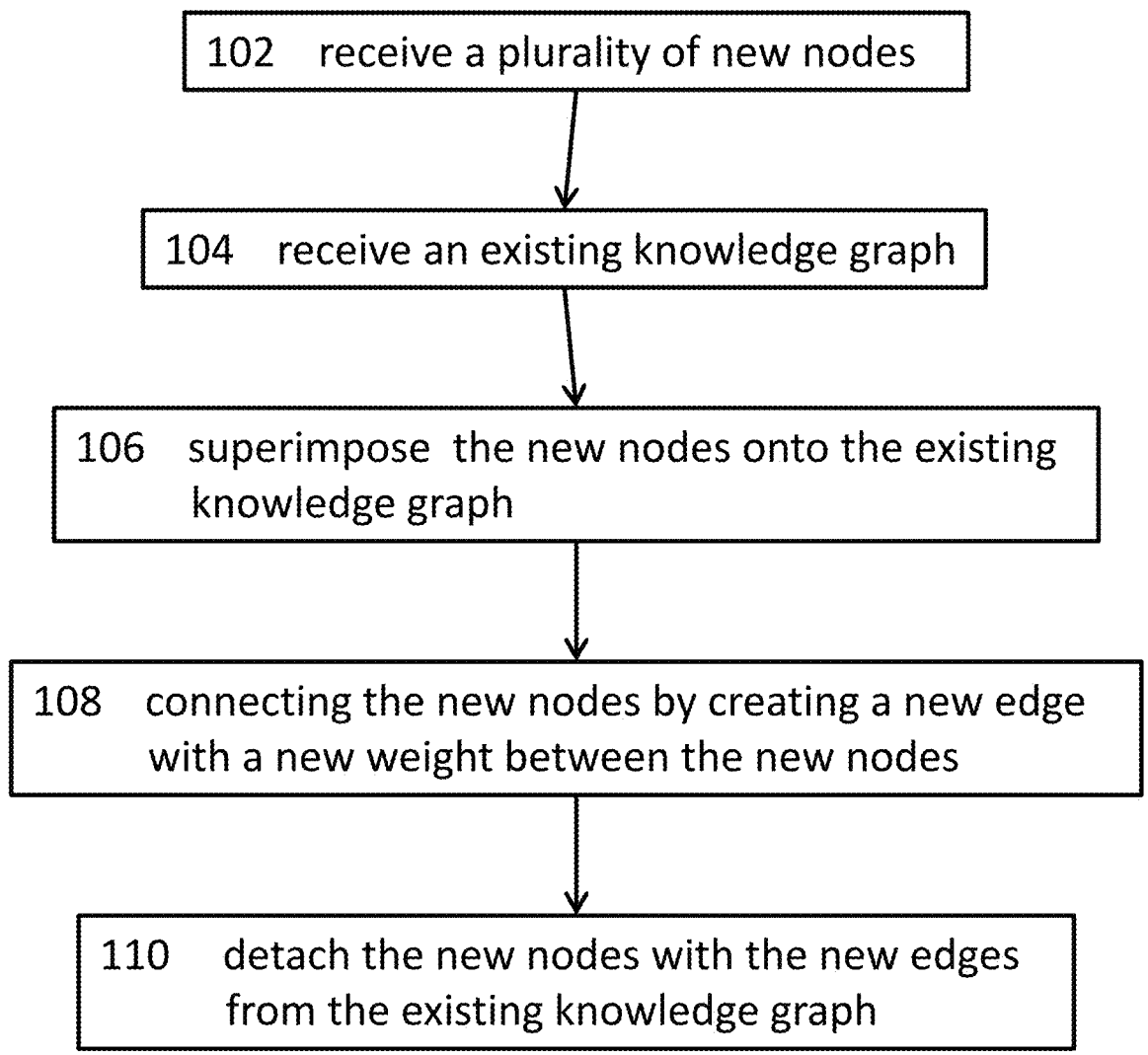
FIG. 1 describes a flow chart of a method for building a knowledge graph, in accordance with embodiments of the present invention.

Unstructured entities of information may be generated in different various contexts, e.g., in a workshop where participants use brainstorming with a vision in mind and writing sticky notes around all the different aspects, in particular, in Design Thinking workshops. Another source of unstructured entities may be in the agile approach for project management, in particular software projects using the SCRUM methodology with four-week cycles calledsprints and the daily 15-minute stand-up meetings and sprint retrospective meetings in which all participants can write sticky notes of the participants' ideas for "what went well", "what could have been improved" and any other action items. Other sources of unstructured entities may be social media tools, blogs, notes from phone conferences and related message exchanges, and the like.

However, without an organizational framework those sticky notes, and other handwritten messages, are single uncorrelated information entities, which does not change after a preprocessing of the input (i.e., the sticky notes, scanning and text recognition for the first of the above-mentioned examples, text recognition for the last example). However, users are left with a set of uncorrelated pieces of information, each containing content (e.g. textual contributions of the participant) and metadata (e.g. participant, timestamp).

A common problem is to organize and present the entities of information in such a way that a summary can be generated automatically and/or a conclusion could be drawn, which would be extremely helpful for teams so that an entire team can better understand the topic and focus on tangible outcomes.

Today, a manual approach is taken, which has natural drawbacks. Firstly, it is tedious and time-consuming, in particular, expensive to group all the entities of information. Secondly, the selection of categories for grouping may depend on the personal view of the person(s) and is therefore, to some extent, arbitrary. Once categories have been chosen for a subset of entities, one may be reluctant to start all over again when for entities of another subset the categories are ill-matching.

Current approaches are more or less "stand-alone," meaning that general knowledge may not be used in order to correlate the uncoordinated entities of information. And thus, there may be in a need for a method and a system overcoming this limitation, in particular correlating the non-correlated pieces of information, i.e., "sticky notes" in an easier way to comprehend.

According to one aspect of the present invention, a method for building a knowledge graph may be provided. The method may comprise receiving a plurality of new nodes, receiving a base knowledge graph comprising existing nodes selectively connected by existing edges, each edge of the edges having an existing weight and superimposing the new nodes onto selected ones of the existing nodes of the base knowledge graph building pairs of new nodes and corresponding existing nodes.

The method may further comprise connecting the new nodes by creating a new edge with a new weight between at least two of the new nodes if corresponding existing nodes in the underlying base knowledge graph have a connection via zero or a predetermined maximum number of existing edges, wherein the new weight is determined based on the existing weights of the existing edges of connections between the corresponding existing nodes, and detaching the new nodes with the new edges from the base knowledge graph as a resulting knowledge graph.

According to another aspect of the present invention, a system for building a knowledge graph may be provided. The system may comprise a first receiving unit adapted for receiving a plurality of new nodes, a second receiving unit adapted for receiving a base knowledge graph comprising existing nodes selectively connected by existing edges, each one of the edges having an existing weight and a superimposing module adapted for superimposing the new nodes onto selected ones of existing nodes of the base knowledge graph building pairs of new nodes and corresponding existing nodes.

Additionally, the system may comprise a linking engine adapted for connecting the new nodes by creating a new edge with a new weight between two of the new nodes if corresponding existing nodes in the underlying base knowledge graph have a connection via zero or a predetermined maximum number of existing edges, wherein the new weight is determined based on the existing weights of the existing edges of connections between the corresponding existing nodes, and a detaching unit adapted for detaching the new nodes with the new edges from the base knowledge graph as a resulting knowledge graph.

The proposed method for building a knowledge graph may offer multiple advantages and technical effects:

An exemplary embodiment of the present invention may utilize the structure of an existing knowledge graph to structure new entities of information. The new entities may be referred to as nodes which may have not been assigned to a position in the knowledge graph. These so-called incoherent nodes may be related to nodes of the existing knowledge graph using a content matching method in order to relate to the formerly incoherent nodes with edges (i.e., interrelationships or links).

However, by not integrating the incoherent nodes but superimposing the incoherent nodes and adding edges between then incoherent nodes based on the knowledge in the existing knowledge graph, the existing knowledge graph remains unchanged (i.e., the incoherent nodes are not integrated into the existing knowledge graph) and a new knowledge graph may be created along the structure of the existing knowledge graph. Thus, the sorting, structuring and organization of the new knowledge graph may have a strong correlation to the existing knowledge graph but may finally be in the new knowledge graph's existence completely independent of the existing knowledge graph. However, the knowledge and experience which has been distilled into the existing knowledge graph may also be reflected in the newly created knowledge graph.

Thus, new entities of information from the various sources, in particular, brainstorming meeting, development meetings, project meetings, personal notes, contribution to blocks and social media tools, and the like, may be organized with the inherent knowledge represented by an existing knowledge graph but without depending on the existing knowledge graph. The new knowledge graph may only reflect the information entities, in particular, the formerly incoherent nodes and relationships (i.e., edges have been created between those nodes). The new resulting knowledge graph may also be free of subjective bias.

In the following, additional embodiments of the present invention will be described.

According to one exemplary embodiment of the method, the superimposing of nodes may use a cognitive computing method for a mapping of content of a new node onto content of an existing node of the base knowledge graph. Thus, the new nodes relating content-wise or alternatively intent-wise in a most optimal way to an existing node may be used for building a pair. This way, it may also be insured that not two different new nodes may be mapped to the same existing node. It may also be noted that the simplest way to match a new node to an existing node may be keyword-based.

According to one exemplary embodiment of the method, each of the plurality of new nodes may comprise content at least partially in text form, which may be achieved by scanning of typed or handwritten notes, handwriting recognition and conversion, speech-to-text conversion or similar techniques in order to make portions of the information entities building sources for new nodes available for a processing by a cognitive engine.

According to one exemplary embodiment of the method, a weight of a new edge between two of the new nodes may be determined by a count of edges forming a shortest connection between the two corresponding nodes of the existing knowledge graph. Thus, also newly built edges of the to-be-created knowledge graph may have weights. There may be different options for assigning weights to the newly created edges, which may also reflect the organization of the base knowledge graph.

Thus, according to another exemplary embodiment of the method, a weight of a new edge between two of the new nodes may be determined by a reciprocal value of a count of edges forming a shortest connection between the two corresponding nodes of the existing knowledge graph.

Furthermore, and according to a further exemplary embodiment of the method, a weight of a new edge between two of the new nodes may be determined by a reciprocal value of a sum of weights of edges forming a shortest connection between the two corresponding nodes of the existing knowledge graph. A skilled person may be able to define additional techniques for building weight factors (e.g., using combinations of the above-mentioned weight assignment techniques by applying selected mathematical functions to the existing weights of the existing nodes in order to derive a new weight factor for a new edge).

According to a further exemplary embodiment, the method may also comprise assigning a score, in particular, a score value, to a new node. This way, different values of importance may be assigned to the new nodes in the resulting knowledge graph. The score values may be used for clustering purposes of the new nodes.

Assigning value, in particular, weights, scores and the like, it may be noted that for the sake of simplicity the expression "assigning a weight" may denote that a numerical value, having the meaning of a weight factor, may be assigned to an edge, etc. The same may apply to a score and a relating numerical score value.

According to one exemplary embodiment of the method, the score, in particular, the score value, may be determined as a sum of the weights of the edges connecting to the new node. Thus, the more edges a new node has, the higher the new node's core value may be. According to another exemplary embodiment of the method, the score may be determined as a count of the edges connecting to the new node. Thus, several different versions of building score values for new nodes may exist.

According to one additionally exemplary embodiment, the method may also comprise building a cluster, in particular, at least one, in the resulting knowledge graph. This way a conglomerate of different aspects of the same theme may be grouped in order for an easier and faster accessibility. Different alternatives for finding centers of the clusters may be available.

According to a further exemplary embodiment of the method, a center of the cluster may be the new node having the highest count of direct edges to other new nodes, or according to another exemplary embodiment of the method, a center of the cluster may be the new node having a node score above a predefined threshold value. The predefined threshold value may be used as a synonym for a clip level. It may also be noted that further techniques may be used to define a new node as a cluster center.

Consequently and according to an additionally exemplary embodiment of the method, a name for the cluster may be identical to a name of the center of the cluster, which may be a straight forward approach to defining a name of the cluster. More comprehensive approaches may be used.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

In the context of this description, the following conventions, terms and/or expressions may be used:

The term 'knowledge graph' may denote a structure within a group of information entities. Core building blocks of a knowledge graph may be nodes comprising the information and edges building links between selected different nodes. The edges may have weights, or weight factors, defining a strength value of a relationship between two nodes. Additionally, the nodes may also have scores or score values, describing some sort of importance of the content of the nodes.

The term 'new node' may denote in the context of this document a piece of information denoted as entity which is assumed to be one of the building blocks of a new knowledge graph. The new node may comprise, at least in parts, the information in some sort of text. Initially, new nodes may not be linked via edges. The new edges may be built as part of the method's process. The new nodes may also be denoted as incoherent nodes in the context of this document.

The term 'base knowledge graph' may denote an existing knowledge graph comprising existing nodes and existing edges having existing weights assigned to the existing edges. The base knowledge graph may in size, in particular, in the number of existing nodes and existing edges, be much larger than the newly to-be-created knowledge graph. The factor may be 100, 10,000 or even 1,000,000, or higher.

The term 'edge' may denote a connection or link between nodes of a knowledge graph. If nodes may typically be presented as boxes, circles and/or ellipses comprising the content inside, edges may typically be presented as lines between the nodes. A weight factor may be assigned to an edge expressing the strength of an interrelationship between the content of the related nodes.

The term 'weight' or weight factor may denote a numerical value describing a relative strength of, for example, a relationship, link or edge, between two nodes of a knowledge graph.

The term 'superimposing' may denote logically placing a new node at the top of an existing node of an existing knowledge graph. Thus, a plurality of pairs of new nodes and existing nodes may be created. The superimposing may be based on a meaning of the information of the note (i.e., based on the content, the intent or a lemma). A lemma or headword, key word, or sometimes catchword may be the word under which a set of related dictionary or encyclopedia entries may appear.

The term 'cluster' may denote a group of interrelated items, in this case, new nodes. A certain strength or weight of related edges between the new nodes may be assumed in order to relate a new node to a given cluster. The clusters may have centers. Different methods may exist to define the centers of clusters.

FIG. 1 describes a flow chart of a method 100 for building a knowledge graph, in accordance with embodiments of the present invention. The method may include step 102, which receives a plurality of new nodes. Step 104 receives a base knowledge graph comprising existing nodes selectively connected by existing edges, each one of the edges having an existing weight and superimposing. Step 106 superimposes the new nodes onto selected ones of the existing nodes from the base knowledge graph building pairs of new nodes and corresponding existing nodes.

Additionally, the method 100 may include step 108, which connects the new nodes by creating a new edge with a new weight, in particular, a new weight value, between at least two of the new nodes if corresponding existing nodes in the underlying base knowledge graph have a connection via zero or a predetermined maximum number of existing edges, wherein the new weight is determined based on the existing weights of the existing edges of connections between the corresponding existing nodes. Step 110 detaches the new nodes with the new edges from the base knowledge graph as a resulting knowledge graph.

Figure 2:
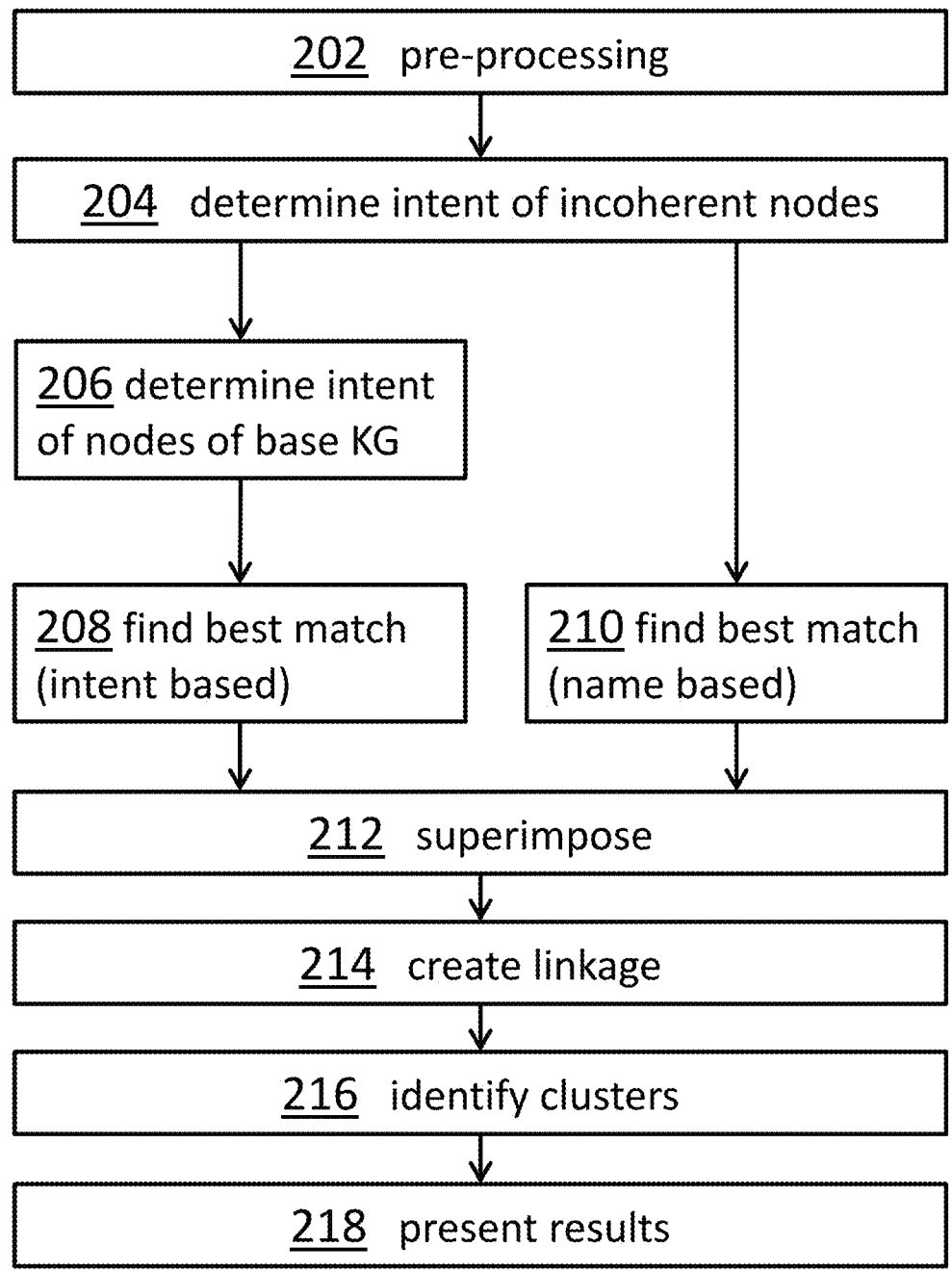
FIG. 2 describes a flow chart of an alternative method from the method of FIG. 1, in accordance with embodiments of the present invention.

FIG. 2 describes a flow chart of an alternative method 200 from the method of FIG. 1, in accordance with embodiments of the present invention. Firstly, step 202 pre-processes the entities, like scanning and/or text recognition is performed in order to create incoherent nodes in a comparable format. These methods maybe performed on hand-written outputs of a workshop. Also speech-to-text conversions and voice recognition may be used to process a discussion and create information entities. Next, step 204 determines the content or intent of each of the incoherent nodes. For this, cognitive computing algorithms for content interpretation may be used in combination with one or more existing knowledge graphs, taxonomies and/or dictionaries, which may be performed by known technologies.

For this, the method may use two alternative approaches: Firstly, step 206 determines the content/intent of all or a subset of the nodes of the base knowledge graph, and step 208 determines a best match (e.g., fuzzy match) of the intent of each incoherent node with the determined intent of nodes of the base knowledge graph. Due to the much larger amount of nodes in the base knowledge graph in comparison to the set of incoherent nodes, this processing requires a comparably larger amount of computing time and computing power if compared to the other steps of the method.

Alternatively, step 210 determines a best match (e.g., fuzzy match) of the content/intent of each incoherent node using names, in particular existing names, of nodes of the base knowledge graph.

Step 212 superimposes the incoherent nodes onto the base knowledge graph according to the best match chosen. Then, step 214 creates edges between the incoherent nodes by using the existing linkage of the base knowledge graph also using metadata (e.g., creator name, time) of the incoherent nodes. Furthermore, step 216 identifies clusters, in particular, at least one, and a naming of the clusters in the newly created knowledge graph. Step 218 converts the resulting knowledge graph into a form for presenting it to a user (i.e., a conversion into a graphically displayable form).

Figure 3:
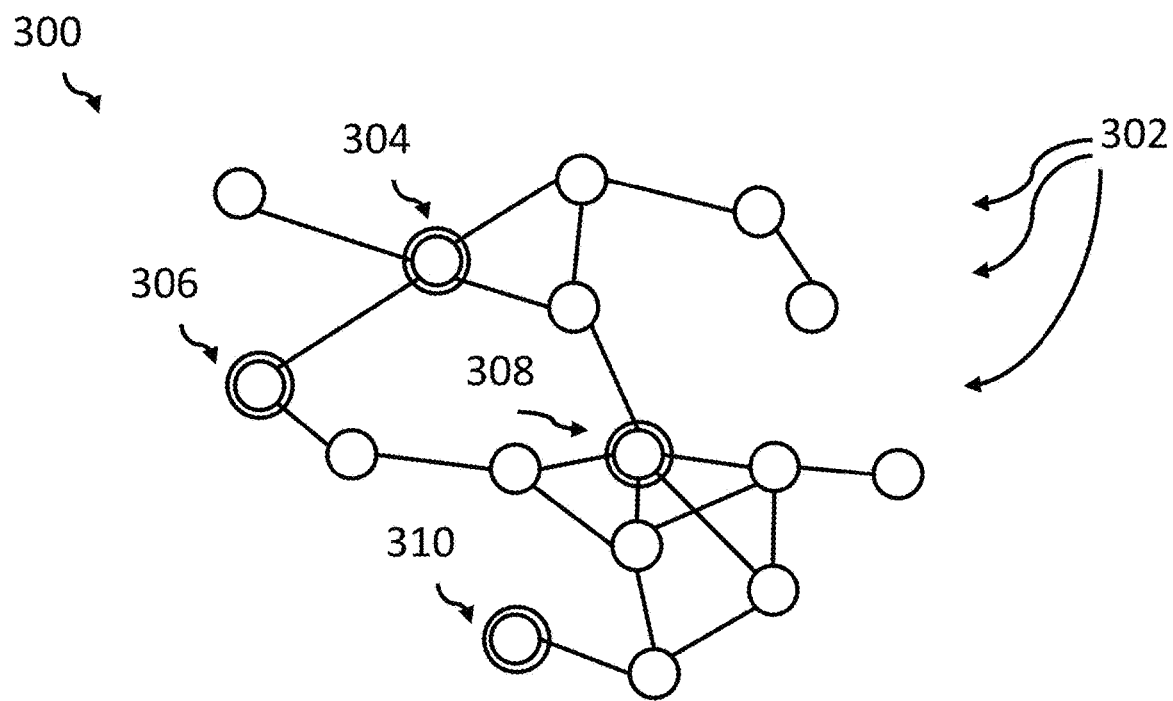
FIG. 3 is a graphical representation of a base knowledge graph and related incoherent nodes, in accordance with embodiments of the present invention.

FIG. 3 is a graphical representation 300 of a base knowledge graph and related incoherent nodes 304, 306, 308, in accordance with embodiments of the present invention. The circles in the figure and the lines between the circles represent nodes and edges of the base knowledge graph 302. The circles larger than the nodes of the base knowledge graph may represent the incoherent or new nodes 304, 306, 308 and 310. The graphical overlaying the hexagons over the circles of the existing base knowledge graph 302 may represent the superimposing of the so far unlinked incoherent nodes 304, 306, 308 and 310 with existing nodes of the base knowledge graph 302.

Figure 4:
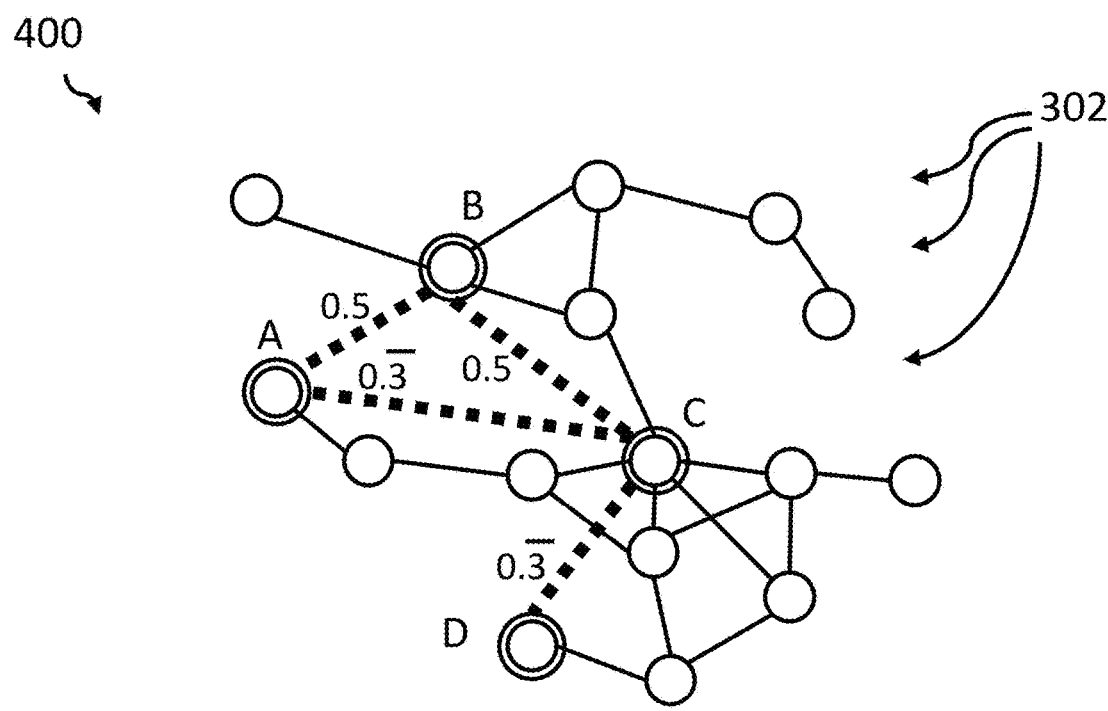
FIG. 4 is a graphical representation of the base knowledge graph with the related incoherent nodes with added links/edges of the resulting knowledge graph, in accordance with embodiments of the present invention.

FIG. 4 is a graphical representation 400 of the base knowledge graph 302 with the related incoherent nodes with added links/edges of the resulting knowledge graph, in accordance with embodiments of the present invention. For each incoherent node (i.e. shown as A, B, C, D in FIG. 4), the edges of the underlying base knowledge graph 302 are followed until a neighboring incoherent node is reached. Two incoherent nodes which are connected by a path running through another incoherent node may not be linked. Also a pre-determined clip level (i.e., threshold) may be applied, for example, the search for links can be stored after a certain length of the path (e.g. number of edges) or after a certain accumulative inverse weight (e.g. some of the inverse weights of the links of the path) has been reached. The edges between the super-imposed, hexagonal incoherent nodes are shown as bold double lines. A clip level may be set to four edges of the base knowledge graph.

Additionally, the weights of the edges in the resulting knowledge graph are shown as the inverse of the path strength found in the base knowledge graph, or, in this example, equivalently given by the inverse of the sum of the inverse weights.

As shown in FIG. 4, A is not linked to D, as the path length is 5. B is not linked to D, as there is no path between B and D without crossing another incoherent node, irrespective of the path length clip level.

In case more than one path connects to incoherent nodes, the shortest path or the path with the largest resulting weight is taken. In another exemplary embodiment, the sum of the weights can be taken and all the weights are optionally normalized to "1" afterwards. In another exemplary embodiment, the root of the sum of the squared weights can be taken to emphasize the path with the highest weight and all weights are potentially normalized to "1" afterwards.

In another exemplary embodiment, the weights of the edges of the resulting knowledge graph are influenced by the metadata of the coherent nodes. For example, if two nodes are from the same author or are created during a workshop at the same time, the weight of the link between the two nodes is increased.

In another exemplary embodiment, additional edges with a pre-determined weight can be added to indicate the same author.

In a next step of the method, clusters of incoherent nodes can be identified to sort the incoherent nodes into categories and name a topic or a theme for each category. For this purpose, all nodes get as a score the sum of the weights of the edges. In another exemplary embodiment, the nodes get as a score the number of edges.

In one exemplary embodiment, the number of clusters may be limited, say to the number n (i.e. only the n nodes with the n highest scores are considered further on). In another exemplary embodiment, all nodes below a pre-determined minimum score are disregarded. In yet another exemplary embodiment, a minimum distance between the cluster cores may be required (i.e., all nodes having a smaller score than neighboring nodes within a certain radius are disregarded). In another exemplary embodiment, a combination of the just-mentioned criteria may be used. In another exemplary embodiment, several cycles of the described approaches may be applied.

For having a closer look at the just-described approaches, the next figures may be considered.

Figure 5:
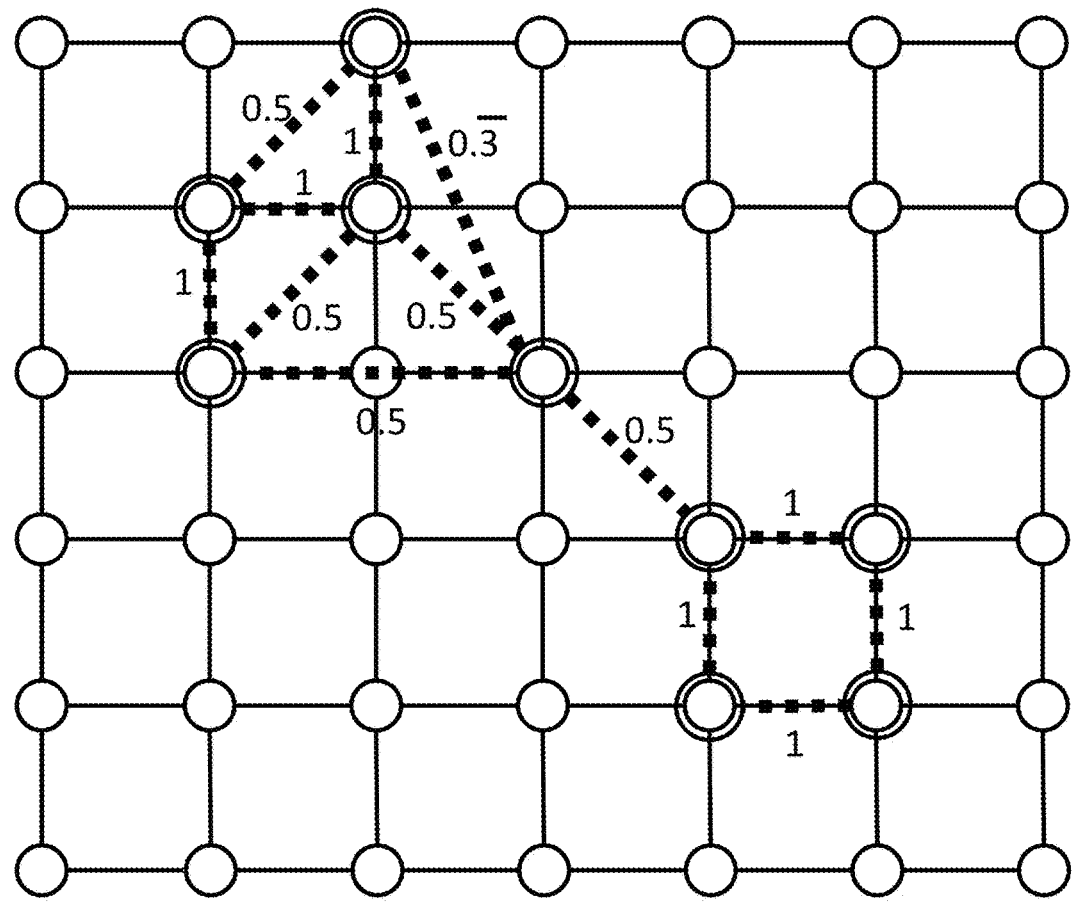
FIG. 5 is a graphical representation of the base knowledge graph and the resulting knowledge graph, also showing weights of the edges, in accordance with embodiments of the present invention.

FIG. 5 is a graphical representation 500 of the base knowledge graph and the resulting knowledge graph, also showing weights of the edges, in accordance with embodiments of the present invention. For the sake of simplicity, the base knowledge graph is shown as a regular grid and all links have the weight "1". In any case, the weight should be normalized to the range between "0" and "1" so that the weight of a path can be expressed as a product of weights (i.e., longer paths have lower weights than shorter paths).

Nine incoherent nodes, shown as larger circles than the nodes of the existing knowledge graph, are super-imposed.

As edge weights of the resulting knowledge graph, the edge of the path of the base knowledge graph is taken. The numbers for the weights are shown right beside each edge. The edges between nodes of the resulting knowledge graph are shown as bold dotted lines.

Figure 6:
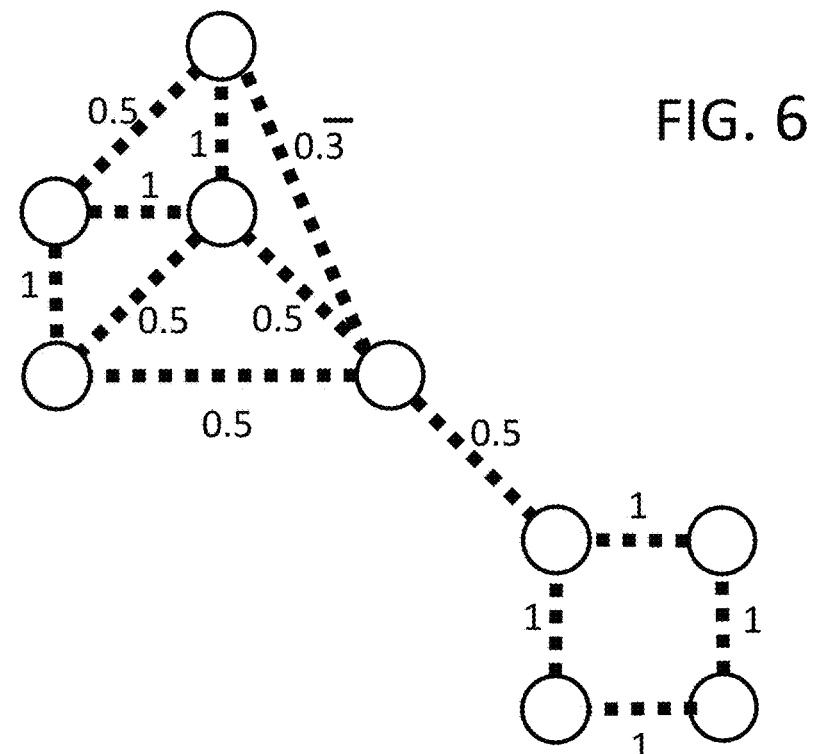
FIG. 6 shows a further graphical representation of the resulting knowledge graph, in accordance with embodiments of the present invention.

FIG. 6 shows a further graphical representation 600 of the resulting knowledge graph, in accordance with embodiments of the present invention. FIG. 6 may only be an extraction of the resulting knowledge graph of FIG. 5 with the same weights for the links.

Figure 7:
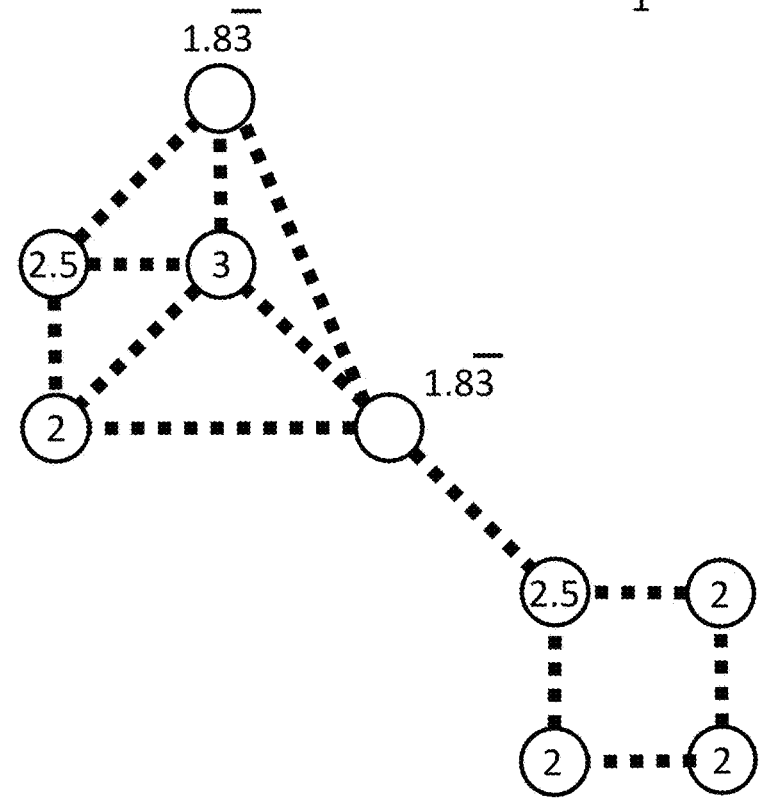
FIG. 7 shows a graphical representation of a resulting knowledge graph with scores for the nodes, in accordance with embodiments of the present invention.

FIG. 7 shows a graphical representation 700 of a resulting knowledge graph with scores for the nodes, in accordance with embodiments of the present invention. In a first iteration, each node receives as a score the sum of the node's edges. In this example the weight of the node's links is set to 2.5, which leaves three possible candidates and two connections between them. One is a direct link (i.e. edge weight 1) and one is a path comprising two edges with a total weight of 0.25=0.5×0.5, which can be verified. One example: the topmost node has 3 links with individual weights of 0.5, 1, 0.3333333 . . . for which a calculation for the remaining nodes of the resulting knowledge graph can be made.

This approach leaves three possible candidates and two edges between them. One is a direct edge (i.e. weight 1) and one is a path comprising two links with a total weight of 0.25=0.5×0.5 as discussed in the next figures.

Figure 8A:
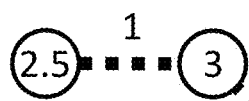
FIG. 8a shows a first graphical representation of potential candidates for centers of clusters, in accordance with embodiments of the present invention.
Figure 8B:
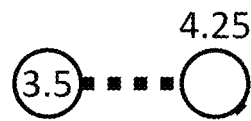
FIG. 8b shows a second graphical representation of potential candidates for centers of clusters, in accordance with embodiments of the present invention.

FIG. 8a shows a first graphical representation 800 of potential candidates for centers of clusters, in accordance with embodiments of the present invention. FIG. 8b shows a second graphical representation 800 of potential candidates for centers of clusters, in accordance with embodiments of the present invention. FIGS. 8a and 8b show embodiments 800 of the potential candidates for centers of clusters because the candidates have the highest score of all nodes in the resulting knowledge graph.

In a second iteration, the weights of the edges connecting the remaining nodes are added to the score of the nodes of the first iteration. In this example, the minimal required score of the second duration is set to 4, leaving only one node as a cluster core (i.e. the one with the score 4.25). Alternatively, the minimum distance between cluster cores could be set to 2, however, any other number could be chosen, resulting in two cluster cores, namely, the nodes with the scores 4.25 and 2.75.

A category name and/or the intent of the cluster core can be selected.

In one exemplary embodiment, a cluster is formed by assigning nodes to the closest cluster core. In another exemplary embodiment, the score of the cluster core is taken as a factor, for example, a gravitational model: score divided by the square of the distance (e.g. measured in number of edges or hops between nodes).

As a non-iterative approach, in another exemplary embodiment, a circle of a pre-determined radius is placed around each node (i.e., following on the path starting from the node until a pre-determined clip level, predetermined threshold value of the sum of the inverse weights is reached). Cluster cores may be nodes with the highest amount of nodes located in the given circle.

In a next step of the method, the resulting knowledge graph may then be converted to a graphically displayable form and presented to a user. The former incoherent nodes are arranged and grouped into named clusters. Color coding can be used to enhance the comprehensibility.

By changing the power meters for the determination of clusters (e.g., number of clusters, minimum score required for a cluster core, minimum distance between clusters, number of iterations), the user can generate different categorizations. A certain categorization is then picked for a related representation purpose.

Figure 9:
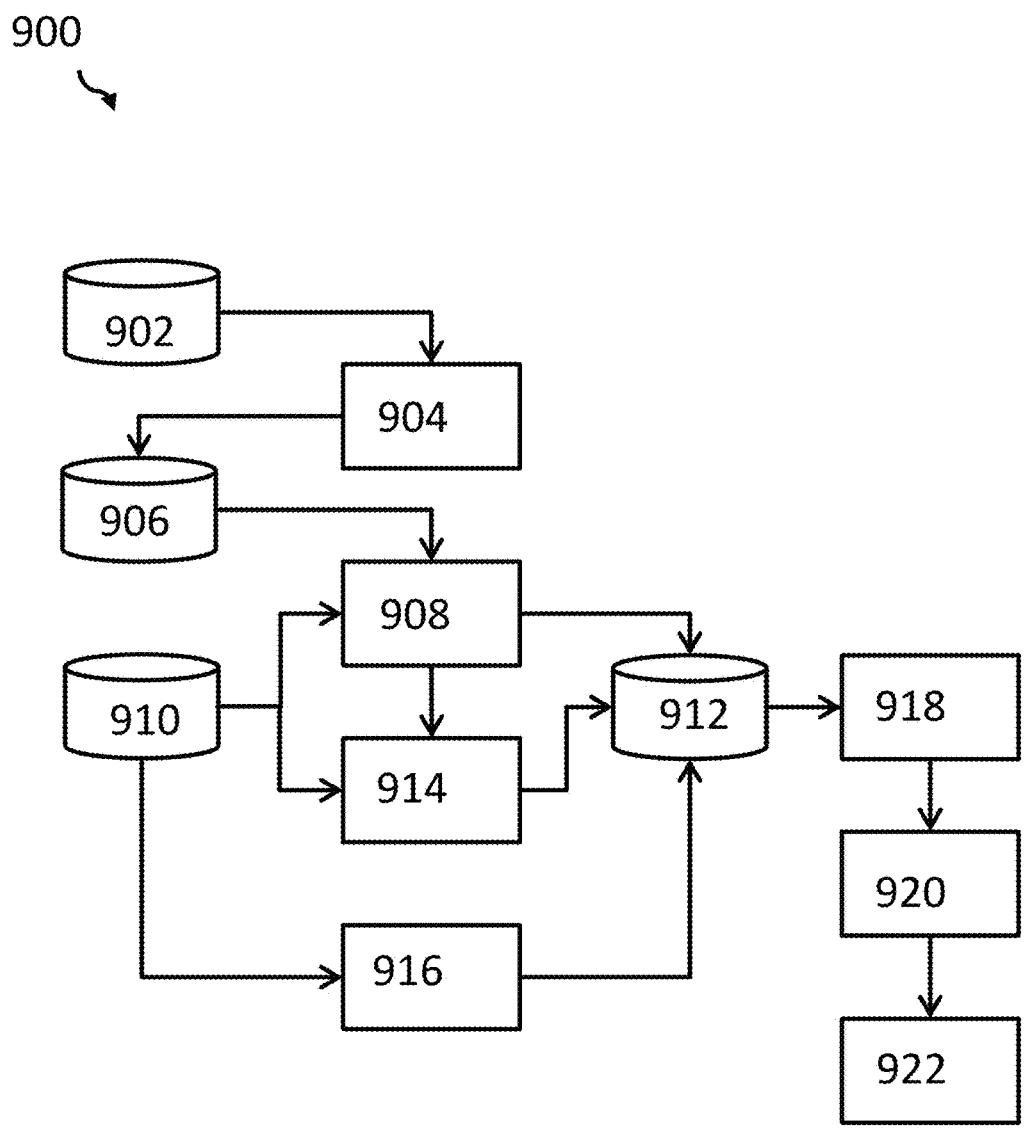
FIG. 9 shows a block diagram of a component model of a system for building a resulting knowledge graph, in accordance with embodiments of the present invention.

FIG. 9 shows a block diagram of a component model 900 of a system for building a resulting knowledge graph, in accordance with embodiments of the present invention. Entities of information 902 are passed to a data pre-processor 904 which generates the incoherent nodes 906 in a standardized format, as explained above. For this, and depending on the format of the entities, the pre-processor 904 may use scanning, optical character recognition, speech to text or similar techniques. A component called intent mapper 908 captures the intent of each incoherent node. In one exemplary embodiment, the intent mapper 908 also captures the intent of all or a subset of the nodes of the base knowledge graph 910, so that the matching engine 914 matches the intent of the incoherent nodes 906 with the intent of the nodes of the base knowledge graph 910. In another embodiment, the matching engine 914 matches the intent of the incoherent nodes 906 with the names and/or description and/or content of the nodes of the base knowledge graph 910, as discussed above in the context of the related method.

The linkage engine 916 follows the links of the base knowledge graph 910 from one super-imposed incoherent node to another superimposed incoherent node. The linkage engine 916 stores the resulting knowledge graph 912 separately from the base knowledge graph 910. This way, the resulting knowledge graph 912 becomes a structure independently from the base knowledge graph 910.

The clustering engine 918 identifies the scores of the clusters, picks a name string from the node name and assigned surrounding nodes of the cluster to the cluster.

The presentation module 920 then renders one or more graphics depicting clusters, nodes and links of the resulting knowledge graph 912. The user interface 922 allows the user to alter power meters of the clustering algorithm to generate different views of the resulting knowledge graph 912. The user may interact with the resulting knowledge graph 912 using a user computing device, to alter the resulting graph or alter the display of the resulting graph 912

Figure 10:
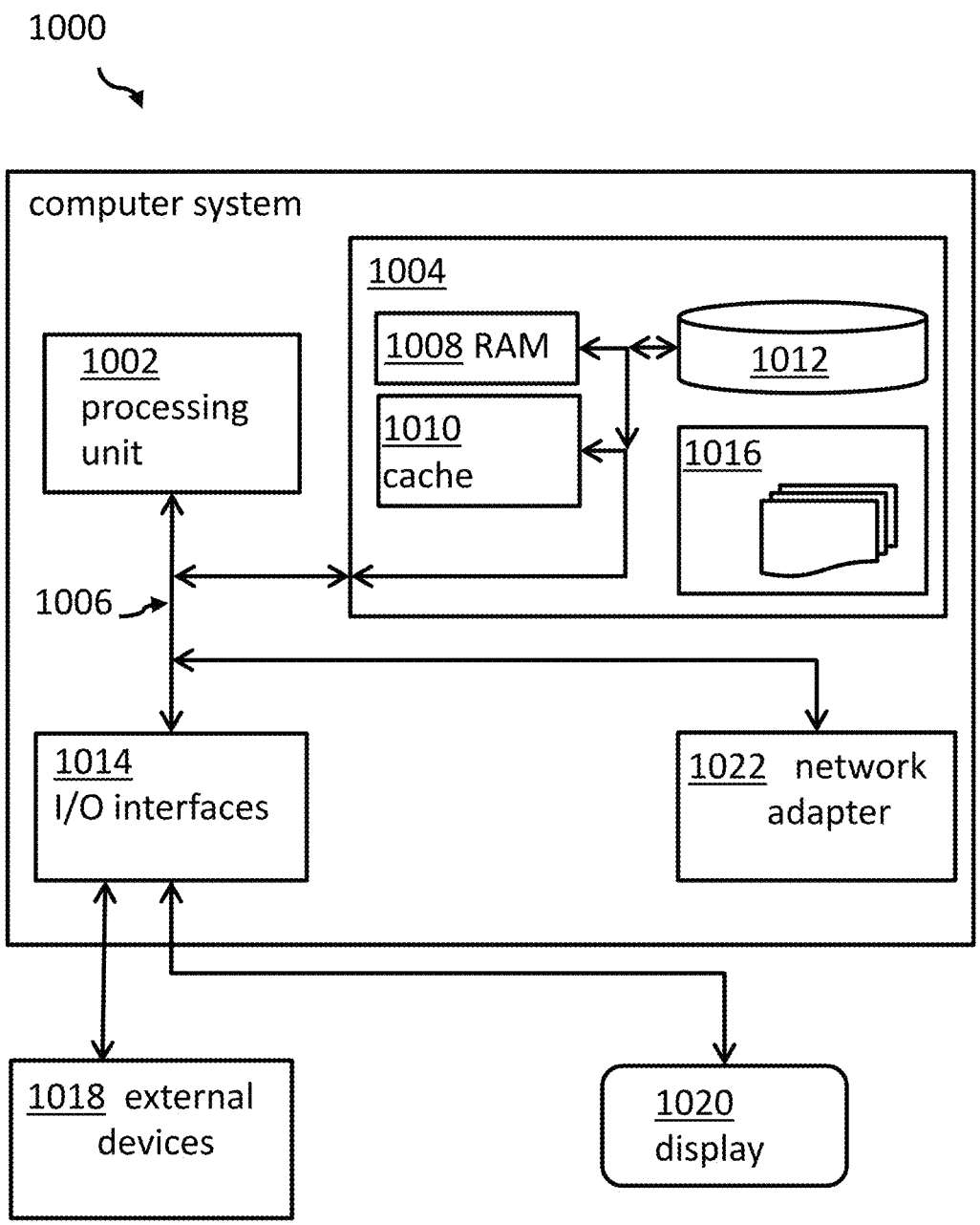
FIG. 10 shows a block diagram of a computing system, in accordance with embodiments of the present invention.

Embodiments of the invention may be implemented together with virtually any type of computer, regardless of the platform being suitable for storing and/or executing program code. FIG. 10 shows a block diagram of a computing system, in accordance with embodiments of the present invention. For instance, FIG. 10 shows a computing system 1000, suitable for executing program code related to the proposed method, and/or act as one or more of the components of the component model according to FIG. 9.

The computing system 1000 is only one example of a suitable computer system and is not intended to suggest any limitation as to the scope of use or functionality of embodiments of the invention described herein. Regardless, computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couples various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (e.g. at least one) of program modules 1016, may be stored in memory 1004 by way of example, and not limitation, as well as an operating system, one or more application programs, other program modules, and program data. Each of the operating system, one or more application programs, other program modules, and program data or some combination thereof, may include an implementation of a networking environment. Program modules 1016 generally carry out the functions and/or methodologies of embodiments of the invention as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of computer system/server 1000 via bus 1006. It should be understood that although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In another embodiment, the proposed invention solves a technical problem necessarily rooted in computer technology because the resulting graph may improve search engine technology, which saves computer resources by providing relevant information in a location that allows the user to avoid navigating to additional website or perform additional searching for information.

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for building a knowledge graph, the method comprising:
   first receiving, by a processor of a computing system, a plurality of new nodes;
   second receiving, by the processor, a base knowledge graph comprising existing nodes selectively connected by existing edges, each edge of the existing edges having an existing weight;
   superimposing, by the processor, the plurality of new nodes onto selected nodes of the existing nodes of the base knowledge graph, building pairs of new nodes and corresponding existing nodes;

connecting, by the processor, the plurality of new nodes by creating a new edge with a new weight between at least two nodes of the plurality of new nodes if corresponding existing nodes in the underlying base knowledge graph have a connection via zero or a predetermined maximum number of existing edges, wherein the new weight is determined based on the existing weights of the existing edges of connections between the corresponding existing nodes; and detaching, by the processor, the plurality of new nodes with the new edges from the base knowledge graph as a resulting knowledge graph.

2. The method according to claim 1, wherein superimposing uses a cognitive computing method for a mapping of content of a new node onto content of an existing node of the base knowledge graph.

3. The method according to claim 1, wherein each node of the plurality of new nodes comprises content at least partially in text form.

4. The method according to claim 1, wherein a weight of the new edge between two nodes of the plurality of new nodes is determined by a count of edges forming a shortest connection between the two corresponding nodes of the existing knowledge graph.

5. The method according to claim 1, wherein a weight of the new edge between two nodes of the plurality of new nodes is determined by a reciprocal value of a count of edges forming a shortest connection between the two corresponding nodes of the existing knowledge graph.

6. The method according to claim 1, wherein a weight of the new edge between two nodes of the plurality of new nodes is determined by a reciprocal value of a sum of weights of edges forming a shortest connection between the two corresponding nodes of the existing knowledge graph.

7. The method according to claim 1, further comprising assigning a score to the new node.

8. The method according to claim 7, wherein the score is determined as a sum of the weights of the edges connecting to the new node.

9. The method according to claim 7, wherein the score is determined as a count of the edges connecting to the new node.

10. The method according to claim 1, further comprising building a cluster in the resulting knowledge graph.

11. The method according to claim 10, wherein a center of the cluster is the new node having a highest count of direct edges to other new nodes.

12. The method according to claim 10, wherein a center of the cluster is the new node having a node score above a predefined threshold value.

13. The method according to claim 10, wherein a name for the cluster is identical to a name of a center of the cluster.

14. A system comprising
a processor;
a memory device coupled to the processor; and
a computer readable storage device coupled to the processor, wherein the storage device contains program code executable by the processor via the memory device to implement a method for building a knowledge graph, the method comprising:
first receiving, by a processor of a computing system, a plurality of new nodes;
second receiving, by the processor, a base knowledge graph comprising existing nodes selectively connected by existing edges, each edges of the existing edges having an existing weight;
superimposing, by the processor, the plurality of new nodes onto selected nodes of the existing nodes of the base knowledge graph, building pairs of new nodes and corresponding existing nodes;
connecting, by the processor, the plurality of new nodes by creating a new edge with a new weight between at least two nodes of the plurality of new nodes if corresponding existing nodes in the underlying base knowledge graph have a connection via zero or a predetermined maximum number of existing edges, wherein the new weight is determined based on the existing weights of the existing edges of connections between the corresponding existing nodes; and
detaching, by the processor, the plurality of new nodes with the new edges from the base knowledge graph as a resulting knowledge graph.

15. The system according to claim 14, wherein the superimposing uses a cognitive computing system for a mapping of the content of the plurality of new nodes onto the content nodes of the base knowledge graph.

16. The system according to claim 14, wherein each of the plurality of new nodes comprises content at least partially in text form.

17. The system according to claim 14, wherein a weight of a new edge between two nodes of the plurality of new nodes is determined by a count of edges forming a shortest connection between the two corresponding nodes of the existing knowledge graph,
or
wherein a weight of the new edge between two nodes of the plurality of new nodes is determined by a reciprocal value of a count of edges forming a shortest connection between the two corresponding nodes of the existing knowledge graph,
or
wherein a weight of the new edge between two nodes of the plurality of new nodes is determined by a reciprocal value of a sum of a weighted number of edges forming a shortest connection between the two corresponding nodes of the existing knowledge graph.

18. The system according to claim 14, further comprising assigning a score to the new node.

19. The system according to claim 18, wherein the score is determined as a sum of the weights of the edges connecting to the new node.

20. The system according to claim 18, wherein the score is determined as a sum of the edges connecting to the new node.

21. The system according to claim 14, further comprising building a cluster in the resulting knowledge graph.

22. The system according to claim 21, wherein a center of the cluster is the new node having a highest number of direct edges to other new nodes.

23. The system according to claim 21, wherein a center of the cluster is the new node having a node score above a predefined threshold value.

24. The method according to claim 21, wherein a name for the cluster is identical to a name of a center of the cluster.

25. A computer program product, comprising a computer readable hardware storage device storing a computer readable program code, the computer readable program code comprising an algorithm that when executed by a computer processor of a computing system implements a method for building a knowledge graph, the method comprising: first receiving, by a processor of a computing system, a plurality of new nodes;

second receiving, by the processor, a base knowledge graph comprising existing nodes selectively connected by existing edges, each edges of the existing edges having an existing weight;

superimposing, by the processor, the plurality of new nodes onto selected nodes of the existing nodes of the base knowledge graph, building pairs of new nodes and corresponding existing nodes;

connecting, by the processor, the plurality of new nodes by creating a new edge with a new weight between at least two nodes of the plurality of new nodes if corresponding existing nodes in the underlying base knowledge graph have a connection via zero or a predetermined maximum number of existing edges, wherein the new weight is determined based on the existing weights of the existing edges of connections between the corresponding existing nodes; and detaching, by the processor, the plurality of new nodes with the new edges from the base knowledge graph as a resulting knowledge graph.

\* \* \* \* \*